May 8, 1956 G. C. SZIKLAI 2,745,038

SEMICONDUCTOR SIGNAL TRANSLATING CIRCUIT

Filed Oct. 26, 1954

INVENTOR.
George C. Sziklai
BY H. L. Newton
ATTORNEY.

United States Patent Office 2,745,038

Patented May 8, 1956

2,745,038

SEMICONDUCTOR SIGNAL TRANSLATING CIRCUIT

George C. Sziklai, Princeton, N. J., assignor to Radio Corporation of America, a corporation of Delaware Application October 26, 1954, Serial No. 464,811

11 Claims. (Cl. 315—30)

The present invention relates generally to signal translating circuits and particularly to wide band signal amplifier and detector circuits for use in television signal receiving systems and the like.

A typical television signal receiving system is a superheterodyne type of receiving system arranged to process both frequency and amplitude modulated signal waves. The brightness information which is utilized to control the kinescope beam intensity and thus reproduce an image of a televised subject is transmitted as amplitude modulation of the carrier wave. This brightness information is recovered from the carrier wave by a suitable amplitude modulation detector or video detector after the carrier wave has been amplified in the form of an intermediate frequency signal wave, but since it is impracticable to provide the necessary system gain in the intermediate frequency signal amplifier portion of the system, it is generally necessary to provide wide band signal amplification between the video detector and the kinescope.

The video signal amplifier portion of a television signal receiving system generally consists of one or two signal amplifier stages compensated to have a good amplitude and time delay characteristic to an upper frequency limit in the order of four megacycles. The output circuit of the video amplifier portion is coupled with the control electrodes of the kinescope to control the beam intensity in accordance with the video signal.

It is an object of the present invention to provide a combined video signal detector and amplifier circuit effectively utilizing a pair of complementary symmetry semiconductor devices.

It is another object of the present invention to provide a signal translating circuit utilizing semiconductor device having symmetrical and complementary characteristics to perform the combined function of amplitude modulation detection and wide band signal amplification.

It is a further object of the present invention to provide a combined video signal detector and amplifier circuit effectively utilizing semiconductor devices having characteristics which are symmetrical and complementary.

It is still another object of the present invention to provide a combined video signal detector and amplifier circuit utilizing semiconductor devices and requiring a minimum of circuit components for efficient reliable operation.

In accordance with the present invention these and other objects are accomplished by providing parallel path signal detection and amplification between a source of amplitude modulated carrier wave energy and the control electrodes of an image reproducing device. A pair of semiconductor devices of opposite conductivity type are arranged in a circuit with corresponding like input electrodes connected in common in the input circuit and corresponding like output electrodes connected to different electrodes of a kinescope. A reverse bias is applied in the output circuit and zero bias is provided in the input circuit. Accordingly, amplitude modulation signal detection is accomplished in the input circuit and an amplified signal is applied to the kinescope electrodes in push-pull relation.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

Figure 1:
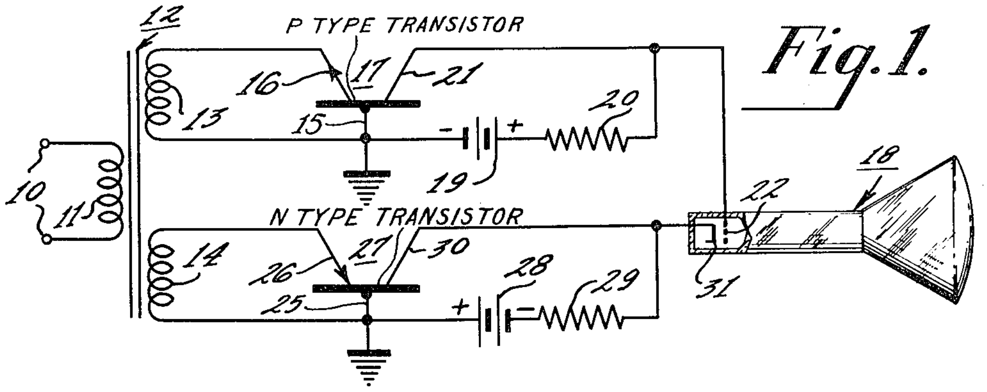
Figure 1 is a schematic circuit diagram of a combined video signal detector and amplifier circuit provided in accordance with the present invention.

Referring now to the drawing and particularly to Figure 1, an input signal may be applied to a pair of input terminals 10 from any convenient source such as the output circuit of the last picture intermediate frequency signal amplifier in a television signal receiving system. The input terminals 10 are connected with the primary winding 11 of an input transformer 12 which also includes a pair of output windings 13 and 14 which may be arranged to provide a pair of signals which are in phase or which are out of phase but in either case of the same amplitude.

The first secondary winding 13 is connected between the base electrode 15 and the emitter electrode 16 of a semiconductor device 17 which provides signal detection and amplification in a first signal translating path between the transformer 12 and a kinescope 18. The semiconductor device 17 is illustrated as an NPN junction transistor, but it is to be understood that other semiconductor devices having appropriate characteristics may be utilized without departing from the scope of this invention.

Energizing current is provided from a source of direct current energizing potential, illustrated as a battery 19, and an output signal is developed across a load impedance element, illustrated as a resistor 20, connected between the positive terminal of the battery 19 and the collector electrode 21 of the semiconductor device 17. Output signals which are developed in the output circuit of the transistor 17 are applied to the control electrode of grid 22 which is directly connected to the collector 21.

The secondary winding 14 is connected between the base electrode 25 and the emitter electrode 26 of a second semiconductor device 27 which provides signal detection and signal amplification in a second signal translating path between the transformer 12 and the kinescope 18. The semiconductor device 27 is illustrated as a PNP junction transistor but it is to be understood that other semiconductor devices having appropriate operating characteristics may be utilized without departing from the scope of the present invention. It is further to be understood that the transistor 17 and the transistor 27 may be interchanged in the circuit with appropriate changes in the polarity of the biasing sources and that the transistor 17 is shown as an NPN junction transistor and the transistor 27 is shown as a PNP junction transistor for the purpose of illustration only.

Energizing current is provided from a source of direct current energizing potential, illustrated as a battery 28, and a load impedance element, illustrated as a resistor 29, is connected between the negative terminal of the battery 28 and the collector electrode 30. Output signals which are developed across the load resistor 29 are applied to the cathode 31 which is directly connected with the collector electrode 30.

Each of the base electrodes 15 and 25 may be directly connected to a point of fixed reference potential such as ground in order to provide a reference point in the circuit.

Signal rectification is accomplished in the base-emitter circuit of each of the transistors 17 and 27 due to the fact that the base-emitter bias of each of the transistors is provided by the signal only. Accordingly, if the incoming signal is zero, the current flow in the emitter base path of each of the transistors will be zero. Accordingly, the collector electrodes 21 and 30 will each offer a relatively high impedance to the associated circuitry, and a minimum of collector electrode current will flow in each of the two output circuits. Therefore, the potential difference which will exist between the control electrode 22 and cathode 31 will be essentially zero thus providing a copious electron beam and maximum brightness in the kinescope 18.

If the brightness thus obtained is excessive, additional biasing may be provided between the grid 22 and a second control electrode or cathode 31 by appropriate means such as an additional battery in the circuit.

As the amplitude of the input signal is increased, signal rectification will be accomplished in the base-emitter electrode path of each of the two transistors 17 and 27 and negative going portions of the input signal wave will provide increased conductivity in the transistor 17 and positive going portions of the input signal wave will provide increased conductivity in the transistor 27. Accordingly, the collector electrode 21 will become more negative with increased conductivity and the collector electrode 30 will become more positive with increased conductivity. It is therefore readily seen that the bias existing between the control electrode 22 and the cathode 31 will be increased with an increase in the input signal amplitude, thereby reducing the brightness in the kinescope 18.

The above described circuit eliminates the need of the usual coupling networks and filters between the conventional detector and signal amplifier, provides direct current coupling to the kinescope and an amplified AGC voltage at the collector electrode 21. Each of the transistors 17 and 27 is subjected to only one-half of the maximum voltage applied between the kinescope grid 22 and cathode 31 thus permitting higher than normally obtainable video signal voltage swing.

Figure 2:
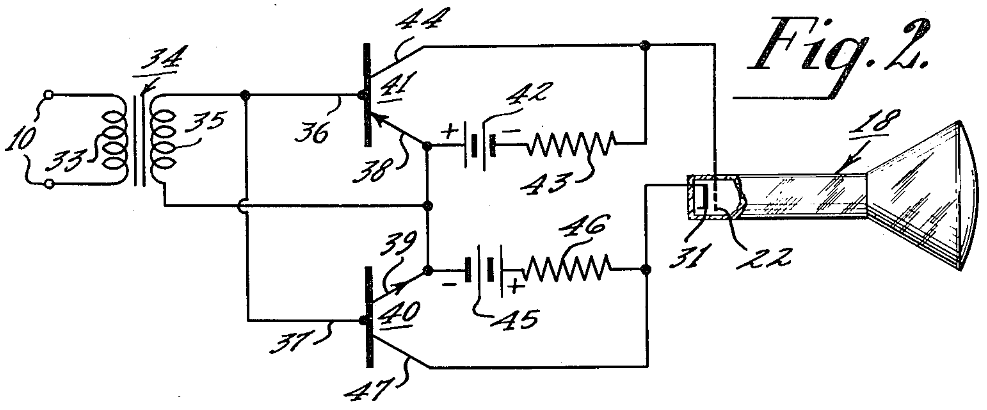
Figure 2 is a schematic circuit diagram of a combined video signal detector and amplifier circuit illustrating a further embodiment of the present invention.

The common base configuration illustrated in Figure 1 is preferred at the present time due to the better detector efficiency provided by this type of circuit arrangement. However, it is within the scope of the present invention to utilize the semiconductor devices in a common emitter configuration as is illustrated in Figure 2.

An input signal may be applied from any convenient source such as the final intermediate frequency signal amplifier in a television receiving system to a pair of input terminals 10 which are connected to the primary winding 33 of an input coupling transformer 34. The input coupling transformer 34 further includes a single secondary winding 35 which is connected in common between the base electrodes 36 and 37 and the emitter electrodes 38 and 39 of a pair of semiconductor devices illustrated as an NPN junction transistor 40 of the high frequency type and a PNP junction transistor 41 also of the high frequency type thereby applying input signals to each of the two parallel signal translating paths between the transformer 34 and a kinescope 18.

Energizing currents for the transistor 41 may be provided from a direct source of energizing potential illustrated as a battery 42, and a load impedance element, illustrated as a resistor 43. The resistor 43 is connected between the negative terminal of the battery 42 and the collector electrode 44 which is also connected to the control grid or control electrode 22 of the kinescope 18. Energizing currents may be provided for the transistor 40 from a source of direct current energizing potential illustrated as a battery 45 and a load impedance element illustrated as a resistor 46 connected between the positive terminal of the battery 45 and the control electrode 47 which is also connected to the cathode 31 of the kinescope 18.

As above described in connection with Figure 1, signal rectification and amplification is provided by each of the two transistors 40 and 41. Input signals are applied between the base and emitter electrodes of each of the two transistors and signal rectification is accomplished in the base-emitter electrode path of each of the transistors. An amplified version of the rectified input signal is developed across the load resistor of each of the two transistors and an input signal is applied between the control electrode 22 and the cathode 31.

Figure 3:
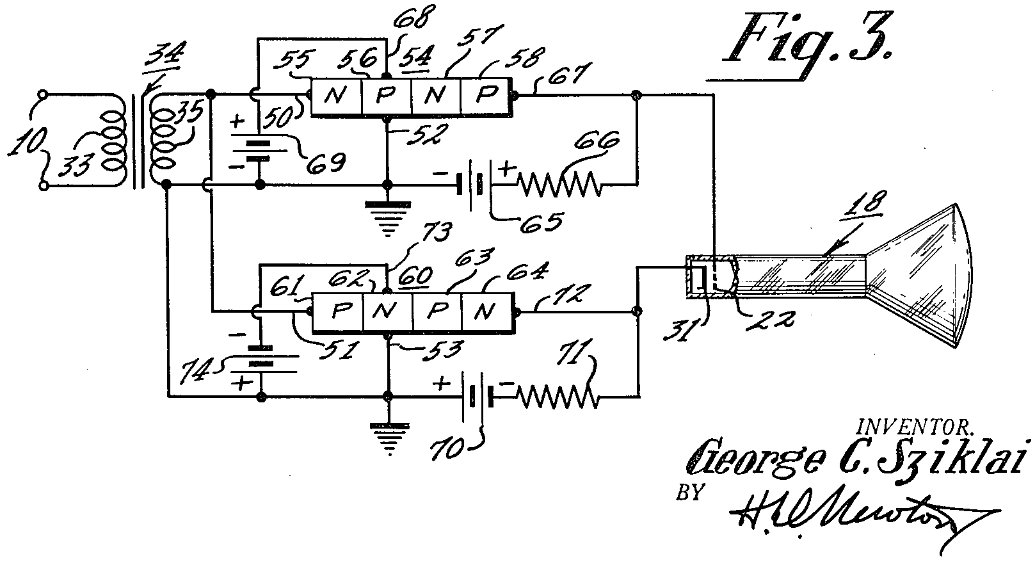
Figure 3 is a schematic circuit diagram of a combined video signal detector and amplifier circuit illustrating still another embodiment of the present invention.

An embodiment of the present invention which may be utilized to provide additional signal gain, particularly at high frequencies, between the intermediate frequency amplifier portion of the television receiving system and the kinescope is illustrated in Figure 3 wherein an input signal may be applied as above discussed from a source of video signal to a pair of input terminals 10 which are connected to the primary winding 33 of an input transformer 34. The secondary winding 35 is connected between the emitter electrodes 50 and 51 and their respective base electrodes 52 and 53 of a pair of tetrode semiconductor devices having a current multiplication in excess of unity due to the use of a hook collector. The first of these devices is illustrated as a tetrode hook transistor 54 including contiguous, alternately opposite conductivity zones of semiconductive material 55, 56, 57 and 58 which are separated by appropriately formed junctions. The second of these devices is illustrated as a tetrode hook transistor 60 including contiguous alternately opposite conductivity zones 61, 62, 63 and 64 of semiconductive material. Information concerning the theory and operation of tetrode semiconductor devices may be obtained from the Proceedings of the I. R. E., November 1952, pages 1395 through 1410 in an article entitled "A Junction Transistor Tetrode for High Frequency Use," by Wallace, Schimpf and Dickten.

Energizing current for the transistor 54 may be provided from any convenient source of direct current voltage, illustrated as a battery 65, and an output signal may be derived across a load impedance element, illustrated as a load resistor 66, connected between the positive terminal of the battery 65 and the collector electrode 67. Bias for the second base electrode 68 is provided by a source of direct current voltage, illustrated as a battery 69 connected between the second base electrode 68 and signal ground.

Energizing currents may be provided for the transistor 60 by a source of direct current energizing potential, illustrated as a battery 70, and a load impedance element, illustrated as a resistor 71. The resistor 71 is connected between the negative terminal of the battery 70 and the collector electrode 72. Bias for the second base electrode 73 may be provided from any convenient source of direct current bias, illustrated as a battery 74 connected between the second base electrode 73 and signal ground.

The control electrode 22 is connected to the collector electrode 67 and the cathode 31 is connected to the collector electrode 72 so that the output signals developed by each of the two tetrode transistors 54 and 60 are applied to the kinescope 18 to control the intensity of the beam.

Signal rectification of an input signal will be accomplished in the emitter-base electrode path of each of the tetrode transistors 54 and 60 as above described in connection with Figures 1 and 2. However, in the present embodiment of the present invention, the output signal will be further amplified due to the current multiplication provided by each of the tetrode transistors 54 and 60, and the signal response is appreciably enhanced due to the tetrode structure of the device. Accordingly, it has been found that the output signal from a conventional final intermediate frequency signal amplifier stage is sufficient to provide a voltage swing in the order of 50 volts between the control electrode 22 and the cathode 31 of the kinescope.

The signal translating circuits provided by the present invention accordingly eliminate the need for the usual coupling networks and filter networks between the video detector and signal amplifier stages, provide direct current coupling to the kinescope electrodes and also provide an amplified AGC voltage which is available from the collector electrode of one of the signal translating devices. The circuits provide the function of signal detection, signal amplification and eliminate the need for the usual direct current reinsertion utilized in conventional television receiving systems. Each of the transistors utilized in the circuits provided by the present invention is subject to only one-half of the required output voltage swing necessary to energize the kinescope.

I claim:

1. A signal translating circuit comprising in combination, a pair of semiconductor devices of opposite conductivity types, each including input and output electrodes, means for applying an alternating current signal to said input electrodes, an image reproducing device including a control electrode and a cathode, signal output means coupling the output electrode of one of said pair of semiconductor devices with said control electrode, and signal output means coupling the output electrode of the other of said pair of semiconductor devices with said cathode.

2. A signal translating circuit comprising in combination, a pair of semiconductor devices of opposite conductivity types, each including input, common and output electrodes, means for applying a modulated alternating current signal of the same instantaneous amplitude between each of said input electrodes and the respective common electrode, an image reproducing device including a control electrode and a cathode, first signal output means connecting the output electrode of one of said pair of semiconductor devices with said control electrode, and second signal output means coupling the output electrode of the other of said pair of semiconductor devices with said cathode whereby said alternating current signal is demodulated, amplified and applied in push-pull relation between said control electrode and said cathode.

3. A signal translating circuit comprising in combination, a pair of semiconductor devices of opposite conductivity types, each including base, emitter and collector electrodes, means for applying a modulated input signal wave of the same instantaneous amplitude between each of said base electrodes and the corresponding emitter electrode, an image reproducing device including a control electrode and a cathode, signal conveying means connecting the output electrode of one of said pair of semiconductor devices with said control electrode, and signal conveying means connecting the output electrode of the other of said pair of semiconductor devices with said cathode.

4. A signal translating circuit comprising in combination, a pair of semiconductor devices each comprising a body of semiconductive material having therein four zones arranged in succession, adjacent zones being contiguous and of opposite conductivity types, means for impressing an input signal of the same instantaneous amplitude between one of the end zones and the intermediate zone contiguous therewith for each of said devices, means connected for applying a bias across said intermediate zone, an image reproducing device including a control electrode and a cathode, and means coupling the other end zone of one of said devices with said control electrode and the other end zone of the other of said devices with said cathode.

5. A signal translating circuit comprising in combination, a pair of semiconductor devices each comprising a body of semiconductive material having therein four zones arranged in succession, adjacent zones being contiguous and of opposite conductivity types, individual electrical connections to said zones, means for impressing an input signal of the same instantaneous phase and amplitude between the connections to one of the end zones and the intermediate zone contiguous therewith for each of said devices, direct current bias means connected to apply a bias across said intermediate zone, an output terminal on the connection to the other end zone of each of said devices, an image reproducing device including a control electrode and a cathode, and means coupling the output terminal of one of said devices with said control electrode and the output terminal of the other of said devices with said cathode.

6. A signal translating circuit comprising in combination, a pair of semiconductor devices of opposite conductivity types, each having input, output and common electrodes, means for applying an alternating current input signal of the same instantaneous phase and amplitude to said input electrodes, a first signal output load device coupled between the output and common electrodes of the first of said pair of devices, a second signal output load device coupled between the output and common electrodes of the second of said pair of semiconductor devices, an image reproducing device including a control electrode and a cathode, and means coupling said first output load device with said control electrode and for coupling said second output load device with said cathode whereby signals applied to said input circuit are rectified and applied in push-pull relation and in amplified form between said control electrode and said cathode.

7. A signal translating circuit comprising in combination, a pair of semiconductor devices of opposite conductivity types, each having base, emitter and collector electrodes, means for applying an alternating current input signal of the same instantaneous phase and amplitude between said base and emitter electrodes, a first signal output load device coupled between the collector and base electrodes of said first device, a second signal output load device coupled between the collector and base electrodes of the second of said pair of semiconductor devices, an image reproducing device including a control electrode and a cathode, and means coupling said first output load device with said control electrode and for coupling said second output load device with said cathode whereby signals applied to said input circuit are rectified and applied in push-pull relation and in amplified form between said control electrode and said cathode.

8. A signal translating circuit comprising in combination, a pair of semiconductor devices of opposite conductivity types, each having base, emitter and collector electrodes, means for applying an alternating current input signal of the same instantaneous phase and amplitude between said base and emitter electrodes, a first signal output load device coupled between the collector and emitter electrodes of said first device, a second signal output load device coupled between the collector and emitter electrodes of the second of said pair of semiconductor devices, an image reproducing device including a control electrode and a cathode, and means coupling said first output load device with said control electrode and for coupling said second output load device with said cathode whereby signals applied to said input circuit are rectified and applied in push-pull relation and in amplified form between said control electrode and said cathode.

9. A signal translating circuit comprising in combination, a pair of semiconductor devices each comprising a semiconductive body having therein four zones arranged in succession, adjacent zones being contiguous and of opposite conductivity types, whereby said zones define three successive arranged junctions, an input circuit connected between one end zone and the intermediate zone contiguous therewith of each of said devices for applying therebetween an input signal, means connected for applying a bias voltage across said intermediate zone, an output circuit connected between said intermediate zone and the other end zone of each of said devices and including means for biasing the junction defined by said other end zone and the intermediate zone contiguous therewith in the forward direction, an image reproducing device including a control electrode and a cathode, and means for coupling the output circuit of one of said devices with said control electrode and the output circuit of the other of said devices with said cathode.

10. A signal translating circuit comprising in combination, a pair of semiconductor devices of opposite conductivity types, each including base, emitter and collector electrodes, an input circuit including a transformer having a primary winding and a secondary winding, said secondary winding being connected in common between the base and emitter electrodes of each of said pair of semiconductor devices, a first output circuit connected between the collector and base electrodes of the first of said pair of semiconductor devices, a second output circuit connected between the collector and base electrodes of the second of said pair of semiconductor devices, an image reproducing device including a control electrode and a cathode, said control electrode being connected with the collector electrode of the first of said pair of semiconductor devices, and the cathode being connected with the control electrode of the second of said pair of semiconductor devices.

11. A signal translating circuit comprising in combination, a pair of semiconductor devices of opposite conductivity types, each including base, emitter and collector electrodes, an input circuit including a transformer having a primary winding and a pair of secondary windings, the first of said pair of secondary windings being connected between the base and emitter electrodes of one of said pair of semiconductor devices, the second of said pair of secondary windings being connected between the base and emitter electrodes of the second of said pair of semiconductor devices, a first output circuit including means for biasing the collector and base electrode path of the first of said pair of semiconductor devices in a reverse direction, a second output circuit including means for biasing the collector and base electrode path of the second of said pair of semiconductor devices in a reverse direction, an image reproducing device including a control electrode and a cathode, said control electrode being connected with the collector electrode of the first of said pair of semiconductor devices, and the cathode being connected with the collector electrode of the second of said pair of semiconductor devices.

References Cited in the file of this patent

UNITED STATES PATENTS

| | | |
|---|---|---|
| 2,226,991 | Schlesinger | Dec. 31, 1940 |
| 2,520,155 | Liekens | Aug. 29, 1950 |
| 2,648,027 | Geohegan | Aug. 4, 1953 |